Oct. 26, 1965  M. J. LEBOW  3,213,679
TORQUE TABLE
Filed June 9, 1961
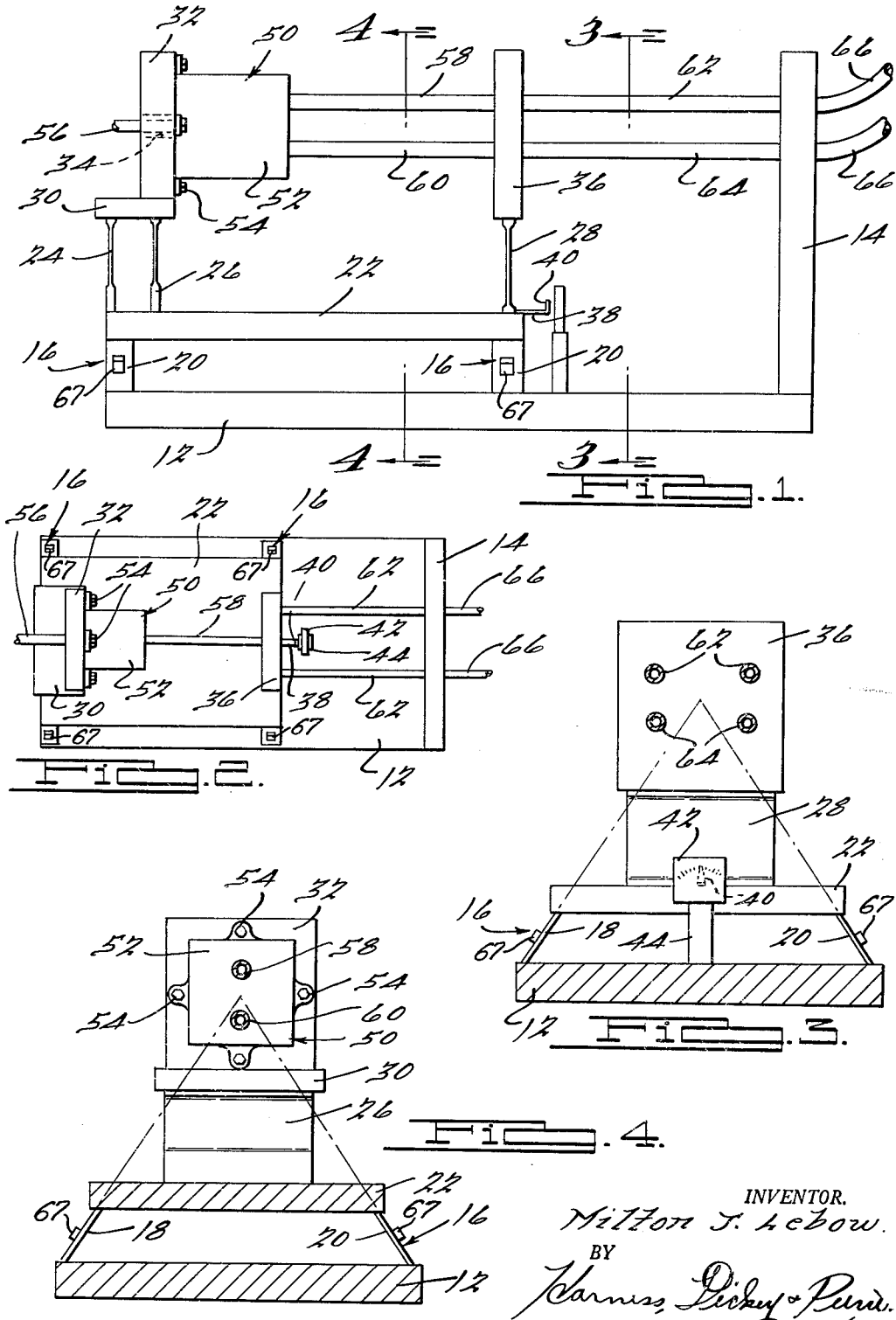
INVENTOR.
Milton J. Lebow.
BY
Harness, Dickey & Pierce.
ATTORNEYS.

United States Patent Office 3,213,679
Patented Oct. 26, 1965

3,213,679
TORQUE TABLE
Milton J. Lebow, Oak Park, Mich., assignor to Lebow Associates, Inc., Oak Park, Mich., a corporation of Michigan
Filed June 9, 1961, Ser. No. 116,033
6 Claims. (Cl. 73—136)

This invention relates to reaction dynamometers and more particularly to a torque reaction measuring system.

Many torque measuring systems include conventional bonded wire resistance strain gages cemented to a pump shaft and the like in a manner well known in the art. The shaft is coupled to a suitable drive motor and the strain gages are wired to slip rings. When the shaft rotates the gages are strained in proportion to the shaft torque. Current passing through the slip rings varies in accordance with the degree of strain in the gages. This variance is indicated on suitable sensing means as a function of shaft torque. It has been found that the slip ring arrangement detracts from the measuring system's accuracy. This is especially pronounced at shaft speeds in excess of 10,000 r.p.m.

The present invention generally relates to reaction dynamometers. Apparatus in accordance with the principles of the present invention, however, will be referred to hereafter as a torque reaction measuring system. Such a system eliminates slip rings and the like found in previous torque measuring systems and is, therefore, sensitive and accurate over a wide range of shaft speeds which can exceed 10,000 r.p.m.

It is, therefore, an important object of this invention to accurately measure the torque of a rotating shaft through a wide range of shaft speeds and at shaft speeds in excess of 10,000 r.p.m.

A further object of the invention is to improve the accuracy of a torque reaction measuring system by eliminating axial thrust loads on the torque table portion of the system and by reducing the torque absorbed by piping which supplies fluid to the test unit.

A further object of the present invention is to provide an accurate, compact and inexpensive system for measuring the torque of a shaft rotating through a substantial range of speeds.

A further object of the invention is to provide an improved torque reaction measuring system having a torque table supported by axially spaced pairs of torsionally flexible straps which permit rotation of the torque table about a preselected axis and a plurality of torsionally inflexible straps disposed between a test unit and the torque table to restrain movement of the torque table about any other axis.

Further objects, features and advantages of this invention will become apparent from a consideration of the following description, the appended claims and the accompanying drawing in which:

FIGURE 1 is a side elevation of a torque reaction measuring system constructed in accordance with the principles of the present invention;

FIG. 2 is a plan view of the system illustrated in FIGURE 1;

FIG. 3 is a vertical sectional view taken along the line 3—3 of FIG. 1 looking in the direction of the arrows; and FIG. 4 is a vertical sectional view taken along the line 4—4 of FIG. 1 looking in the direction of the arrows.

Referring now to the drawing, FIGURES 1–4 illustrate one embodiment of a torque measuring system constructed in accordance with the principles of the present invention. The system includes a base 12 having an upright support member 14 rigidly connected to one end thereof. At the opposite end of the base 12, pairs of axially separated flexures 16 are fixed to the base 12 by suitable fastening means such as welding. Each pair of flexures 16 consists of oppositely disposed strap-like members 18, 20 which are preferably flat, thin plates having a substantial width in an axial direction. The members 18, 20 extend upwardly in planes which intersect to define a line parallel to and spaced from the torque table 22 for reasons to be discussed. The upper ends of the members 18, 20 are rigidly attached to a torque table 22.

The torque table 22 carries a pair of transverse flexures or thin cross-sectioned members 24, 26 at one end and a single transverse flexure 28 of thin cross section at the opposite end. Each of the transverse flexures 24, 26, 28 have substantial transverse widths and are, therefore, torsionally inflexible for reasons to be discussed.

The transverse flexures 24, 26 carry a flat plate 30 which supports an upright plate 32 having an aperture 34 formed therein. Similarly, the transverse flexure 28 carries a manifold 36. The upper and lower ends of the transverse flexures 24, 26, 28 are rigidly attached to the flat plate 30, manifold 36 and the torque table 22, respectively.

A longitudinal arm 38 on the torque table 22 has an upright pointer 40 which indicates an angular deflection on a suitable scale 42 mounted on a column 44 rigidly connected to the base 12.

The aforedescribed system accurately measures the torque present in the shaft of an energy converting mechanical device such as a pump, hydraulic motor or the like. In the drawing such a mechanical device is generally designated 50. Suitable fastening means such as studs 54 rigidly connect the casing 52 of the device 50 to the upright plate 32. The device 50 has a shaft 56 which extends from the casing 52 through the aperture 34 formed in the upright plate 32.

In order to measure the shaft torsion under full load-operating conditions, conduits supply fluid to and from the unit. In the illustrated embodiment, the device is operating as a fluid motor with pressurized fluid being supplied through an inlet line 58 and being returned through an outlet line 60 between the device 50 and the manifold 36. Alternatively, the manifold 36 could be mounted on the device 50 rather than on a spaced flexure plate such as flexure 28.

A plurality of inlets 62 and a plurality of outlets 64 connected to the manifold 36 have a preselected torsional flexibility for reasons to be discussed. The two inlets and two outlets illustrated are merely a representative arrangement. It should be understood that a greater number of inlets or a greater number of outlets may be provided to give a suitable torsional flexibility for a given fluid capacity. Alternatively, a single low pressure conduit of light flexible construction may be substituted for the low pressure piping in a given system. A low pressure conduit of natural or synthetic resilient material such as rubber and the like would have suitable flexibility.

Lines or conduits 66 connect the inlets 62 and outlets 64 to a suitable fluid system.

The operation of the torque reaction measuring system comprises connecting the mechanical device 50 on the upright plate 32 and either connecting the shaft 56 to a suitable drive motor (not shown) or supplying pressure to the mechanical device 50 to drive it as a hydraulic motor. In either case, the shaft 56 of the device 50 is rotated at high speeds. The rotation produces torsion in the shaft 56 which acts on the case 52 of the unit 50 to rotate it about an axis defined by the shaft 56. The case rotation is proportional to the torsion in the shaft 56. As was indicated above, the flexures 24, 26 and 28 are relatively wide in the transverse direction and, therefore, are inflexible to torsional forces imposed thereon. Thus, the rotation of case 52 caused by the torsion in the shaft 56 is transferred through the flexures 24, 26 and 28 to the torque table 22 to bend the torsionally flexible members 18, 20 and move the pointer 40 with respect to the scale 42. This rotation can be calibrated to read out the exact shaft torsion.

Other measuring devices may also be used such as conventional resistance strain gages 67 cemented on the members 18, 20 in a manner well known in the art. The bending in the members 18, 20 strains the gages to vary a suitable output signal in proportion to the torque in the shaft 56.

The flexure members 18, 20 are in oppositely disposed planes which extend upwardly from the base 12 to intersect in a line which is preferably co-linear with the longitudinal axis defined by the pump shaft 56. This arrangement provides a large load-carrying capacity without affecting the system's torque measuring accuracy since the vertical loading of the mechanical device 50 places the members 18, 20 in pure compression without subjecting them to bending.

The axially spaced pairs of flexures 16 are also isolated from the bending effect of axial forces on the device 50 such as those caused by fluid flowing through the lines 58, 60. Such axial forces cause the transverse flexures 24, 26 and 28 to yield without transferring the force to the torque table 22. The upright support member 14 is rigidly connected to the device 50 through the lines 58, 60, 62 and 64 to transfer the axial forces imposed on the test unit 50 to the rigid base 12.

The system's sensitivity is greatest when substantially all of the torque energy rotates the torque table 22. If the piping system supplying fluid to the device 50 is both torsionally and axially rigid it will absorb a substantial percentage of the total torsional energy. Thus, a plurality of torsionally flexible inlet and outlet pipes 62 and 64 are provided so that substantially all of the torque of the test unit 50 will be transferred by the flexures 24, 26 and 28 to rotate the torque table 22 about an axis parallel to the axis defined by the pump shaft 56. A multiplicity of small diameter pipes produces a torsionally flexible pipe system which is especially suited to the objects of the invention.

From the foregoing discussion it can be seen that I have developed a compact, efficient system for accurately measuring the shaft torque of energy conversion devices. The system is highly sensitive and adapted for use with a wide range of indicating means for reading out a torque reading.

It will be understood that the specific construction of the improved torque table which is herein disclosed and described is presented for purposes of explanation and illustration and is not intended to indicate limits of the invention, the scope of which is defined by the following claims.

What is claimed is:

1. A device for determining the torque in a shaft of a fluid-type energy converting means, including first and second platform means, torque-responsive means comprising a plurality of flat flexure elements interconnecting said two platform means, said elements being arranged in axially spaced pairs, one element of each of said pairs lying in a first plane and the other element of each of said pairs lying in a second plane, the intersection of said first and second planes defining an axis coincident with the rotational axis of the shaft, said elements being flexible about a longitudinal axis extending parallel to said rotational axis and substantially inflexible about a horizontal axis, extending transversely to said rotational axis, an inlet line and an outlet line connected to the energy converting means, each of said lines being rigid in a direction parallel to the rotational axis of the shaft, and non-torque-responsive means comprising a plurality of flexure elements interconnecting said first platform means and the energy converting means, said non-torque-responsive flexure elements being flexible about a horizontal axis extending substantially transversely to said rotational axis of the shaft and being substantially inflexible about a longitudinal axis extending substantially parallel to said rotational axis.

2. A device for determining the torque in a shaft of an energy converting means, including first and second platform means, a plurality of torque-responsive flexure elements interconnecting said two platform means, and non-torque-responsive means including deformable support means interconnecting said first platform means and the energy converting means, said non-torque-responsive means comprising a plurality of flexure elements being flexible about a horizontal axis extending substantially transversely to the rotational axis of the shaft and being substantially inflexible about a longitudinal axis extending substantially parallel to said rotational axis, said non-torque-responsive means being adapted to isolate said first platform means from movements of the energy converting means in a direction parallel to the rotational axis of the shaft.

3. A device for determining the torque in a shaft of a fluid-type energy converting means, including first and second platform means, a plurality of torque-responsive flexure elements extending between and interconnecting said first and said second platform means, said torque-responsive means comprising a plurality of flat flexure elements, said elements being arranged in axially spaced pairs, one element of each of said pairs lying in a first plane and the other element of each of said pairs lying in a second plane, the intersection of said first and second planes defining an axis coincident with the rotational axis of the shaft, said elements being flexible about a longitudinal axis extending parallel to said rotational axis and substantially inflexible about a horizontal axis extending transversely to said rotational axis, a plurality of non-torque-responsive flexure elements deformable in a direction parallel to said rotational axis extending between and interconnecting said first platform means and the energy converting means, an inlet line and an outlet line connected to said energy converting means, each of said lines being rigid in a direction parallel to the rotational axis of the shaft, said non-torque-responsive flexure elements being adapted to isolate said first platform means from movements of energy converting means in a direction parallel to the rotational axis of the shaft.

4. A device for determining the torque in a shaft of a fluid-type energy converting means, including first and second platform means, torque-responsive means interconnecting said two platform means, said torque-responsive means comprising a plurality of flat flexure elements, said elements being arranged in axially spaced pairs, one element of each of said pairs lying in a first plane and the other element of each of said pairs lying in a second plane, the intersection of said first and second planes defining an axis coincident with the rotational axis of the shaft, said elements being flexible about a longitudinal axis extending parallel to said rotational axis and substantially inflexible about a horizontal axis extending transversely to said rotational axis, first non-torque-responsive means interconnecting said first platform means and the energy converting means, manifold means, second non-torque-responsive means interconnecting said manifold means and said first platform means, said non-torque-responsive means comprising a plurality of flexure elements being flexible about a horizontal axis extending substantially transversely to said rotational axis of the shaft and being substantially inflexible about a longitudinal axis extending substantially parallel to said rotational axis, a plurality of inlet and outlet lines for communicating fluid to and from said manifold means, single inlet and outlet lines for communicating fluid between said manifold means and the energy converting means, said first and second non-torque-responsive means being adapted to isolate said first platform means from movements of the energy converting means in a direction parallel to the rotational axis of the shaft.

5. A device for determining the torque in a shaft of a fluid type energy converting means, including first and second spaced platform means, a first flexure element interconnecting said first platform means and the energy converting means for supporting the latter, manifold means, a second flexure element interconnecting said first platform means and said manifold means for supporting the latter, said first and second flexure elements being flexible about a horizontal axis extending transversely to the rotational axis of the shaft and being substantially inflexible about a longitudinal axis extending parallel to said rotational axis; a plurality of inlet and outlet lines connected to said manifold means, single inlet and outlet lines interconnecting said manifold means and said energy converting means, all of said lines being rigid in a direction parallel to said rotational axis, first and second axially spaced pairs of torque-responsive flexure elements interconnecting said two platform means, one member of each of said pairs lying in a first plane and the other member of each of said pairs lying in a second plane, the intersection of said first and second planes defining an axis coincident with said rotational axis, said first and second pairs of torque-responsive flexure elements being flexible about a longitudinal axis extending parallel to said rotational axis and substantially inflexible about a horizontal axis extending transversely to said rotational axis, and indicating means connected to said first and second platform means for indicating the relative movement thereof.

6. A device for determining the torque in a shaft of a fluid type energy converting means, including first and second spaced platform means, a first flexure element interconnecting said first platform means and the energy converting means for supporting the latter, manifold means, a second flexure element interconnecting said first platform means and said manifold means for supporting the latter, said first and second flexure elements being flexible about a horizontal axis extending transversely to the rotational axis of the shaft and being substantially inflexible about a longitudinal axis extending parallel to said rotational axis, a plurality of inlet and outlet lines connected to said manifold means, single inlet and outlet lines interconnecting said manifold means and said energy converting means, all of said lines being rigid in a direction parallel to said rotational axis, first and second axially spaced pairs of torque-responsive flexure elements interconnecting said two platform means, one member of each of said pairs lying in a first plane and the other member of each of said pairs lying in a second plane, the intersection of said first and second planes defining an axis coincident with said rotational axis, said first and second pairs of torque-responsive flexure elements being flexible about a longitudinal axis extending parallel to said rotational axis and substantially inflexible about a horizontal axis extending transversely to said rotational axis, and indicating means comprising a plurality of strain gauges secured to said first and second pairs of torque-responsive flexure elements for indicating the relative movement between said first and second platform means.

References Cited by the Examiner

UNITED STATES PATENTS 2,389,361 11/45 Hagg et al. _____ 73—134
2,845,795 8/58 Emmerling _____ 73—136

RICHARD C. QUEISSER, *Primary Examiner.*

ROBERT L. EVANS, *Examiner.*